United States Patent
Natsui et al.

(10) Patent No.: US 11,955,622 B2
(45) Date of Patent: Apr. 9, 2024

(54) POSITIVE ELECTRODE ACTIVE MATERIAL AND BATTERY COMPRISING THE SAME

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 697 days.

(21) Appl. No.: 17/089,670

(22) Filed: Nov. 4, 2020

(65) Prior Publication Data

US 2021/0057717 A1    Feb. 25, 2021

Related U.S. Application Data (63) Continuation of application No. PCT/JP2019/008784, filed on Mar. 6, 2019.

(30) Foreign Application Priority Data

May 31, 2018  (JP) ................................ 2018-104167

(51) Int. Cl.
*H01M 4/131* (2010.01)
*C01G 53/00* (2006.01)
(Continued)

(52) U.S. Cl.
CPC ............ *H01M 4/131* (2013.01); *C01G 53/50* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS

2015/0325844 A1* 11/2015 Inoue .................... H01M 4/364
  429/304
2015/0380720 A1* 12/2015 Kim .................... H01M 4/0435
  252/182.1
(Continued)

FOREIGN PATENT DOCUMENTS

| CN | 103050683 A | * 4/2013 |
|---|---|---|
| WO | 2014/192759 | 12/2014 |
| WO | 2017/204164 | 11/2017 |

OTHER PUBLICATIONS

Machine Translation of CN-103050683-A (Year: 2013).*
Guo et al. "Aluminum and fluorine co-doping for promotion of stability and safety of lithium-rich layered cathode material"; Electrochimica Acta 236 (2017); pp. 171-179; Mar. 17, 2017 (Year: 2017).*

(Continued)

*Primary Examiner* — Gregg Cantelmo
(74) *Attorney, Agent, or Firm* — Rimon P.C.

(57) ABSTRACT

A positive electrode active material according to the present disclosure includes a lithium composite oxide. The lithium composite oxide is a multiphase mixture including a first phase having a crystal structure belonging to space group C2/m and a second phase having a crystal structure belonging to space group R-3m and includes at least one selected from the group consisting of F, Cl, N, and S. In an XRD pattern of the lithium composite oxide, the integrated intensity ratio $I_{(20°-23°)}/I_{(18°-20°)}$ of a second maximum peak present in a diffraction angle 2θ range of greater than or equal to 20° and less than or equal to 23° to a first maximum peak present in a diffraction angle 2θ range of greater than or equal to 18° and less than or equal to 20° satisfies $0.05 \leq I_{(20°-23°)}/I_{(18°-20°)} \leq 0.26$.

5 Claims, 2 Drawing Sheets

(51) Int. Cl.

| | | |
|---|---|---|
| *H01M 4/02* | (2006.01) | |
| *H01M 4/134* | (2010.01) | |
| *H01M 4/36* | (2006.01) | |
| *H01M 4/505* | (2010.01) | |
| *H01M 4/525* | (2010.01) | |
| *H01M 10/0525* | (2010.01) | |

(52) U.S. Cl.
CPC ........... *H01M 4/505* (2013.01); *H01M 4/525* (2013.01); *H01M 10/0525* (2013.01); *C01P 2002/74* (2013.01); *H01M 2004/027* (2013.01); *H01M 2004/028* (2013.01)

(56) References Cited

U.S. PATENT DOCUMENTS

| | | | |
|---|---|---|---|
| 2016/0028072 A1* | 1/2016 | Sakai | H01M 4/525 |
| | | | 429/223 |
| 2016/0056462 A1 | 2/2016 | Sakai et al. | |
| 2018/0145368 A1* | 5/2018 | Ochiai | H01M 4/485 |
| 2019/0296347 A1 | 9/2019 | Sakai | |

OTHER PUBLICATIONS

Min et al. "Simple, robust metal fluoride coating on layered Li1.23Ni0.13Co0.14Mn0.56O2 and its effects on enhanced electrochemical properties"; Electrochimica Acta 100 (2013); pp. 10-17; Mar. 30, 2013. (Year: 2013).*

International Search Report of PCT application No. PCT/JP2019/008784 dated Jun. 4, 2019.

Jianming Zheng et al., "Improved electrochemical performance of Li[Li0.2Mn0.54Ni0.13Co0.13]O2 cathode material by fluorine incorporation", Electrochimica Acta 105, Aug. 30, 2013, pp. 200-208.

Jay Hyok Song et al., "Suppression of irreversible capacity loss in Li-rich layered oxide by fluorine doping", Journal of Power Sources 313, May 1, 2016, pp. 65-72.

Bing Guo et al., "Aluminum and fluorine co-doping for promotion of stability and safety of lithium-rich layered cathode material", Electrochimica Acta 236, May 19, 2017, pp. 171-179.

L. Li et al., "Retarded phase transition by fluorine doping in Li-rich layered Li1.2Mn0.54Ni0.13Co0.13O2 cathode material", Journal of Power Sources 283, Feb. 19, 2015, pp. 162-170.

* cited by examiner

POSITIVE ELECTRODE ACTIVE MATERIAL AND BATTERY COMPRISING THE SAME

BACKGROUND

1. Technical Field

The present disclosure relates to a positive electrode active material and a battery comprising it.

2. Description of the Related Art

International Publication No. WO 2014/192759 discloses a lithium composite transition metal oxide having a chemical composition represented by a formula: $Li_aMO_x$ (here, M is an element including at least one selected from a Ni element, a Co element, and a Mn element). In an X-ray diffraction pattern of the lithium composite transition metal oxide, the ratio of the integrated intensity (I020) of the peak of a (020) plane pertaining to the crystal structure of space group C2/m to the integrated intensity (I003) of the peak of a (003) plane pertaining to the crystal structure of space group R-3m, (I020/I003), is 0.02 to 0.3.

SUMMARY

One non-limiting and exemplary embodiment provides a positive electrode active material that is used for a battery having a high capacity.

In one general aspect, the techniques disclosed here feature a positive electrode active material comprising a lithium composite oxide, wherein the lithium composite oxide is a multiphase mixture including a first phase having a crystal structure belonging to space group C2/m and a second phase having a crystal structure belonging to space group R-3m, and the lithium composite oxide contains at least one selected from the group consisting of F, Cl, N, and S and satisfies the following mathematical expression (I): $0.05 \leq$ integrated intensity ratio $I_{(20°\text{-}23°)}/I_{(18°\text{-}20°)} \leq 0.26$. Here, the integrated intensity ratio $I_{(20°\text{-}23°)}/I_{(18°\text{-}20°)}$ is equal to the ratio of the integrated intensity $I_{(20°\text{-}23°)}$ to the integrated intensity $I_{(18°\text{-}20°)}$; the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide; and the integrated intensity $I_{(20°\text{-}23°)}$ is an integrated intensity of a second maximum peak present in a diffraction angle 2θ range of greater than or equal to 20° and less than or equal to 23° in the X-ray diffraction pattern of the lithium composite oxide.

The present disclosure provides a positive electrode active material for achieving a battery having a high capacity. The present disclosure also provides a battery including a positive electrode containing the positive electrode active material, a negative electrode, and an electrolyte. The battery has a high capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will now be described. Embodiment 1.

The positive electrode active material in Embodiment 1 comprises:
a lithium composite oxide, wherein
the lithium composite oxide is a multiphase mixture including a first phase having a crystal structure belonging to space group C2/m and a second phase having a crystal structure belonging to space group R-3m;
the lithium composite oxide contains at least one selected from the group consisting of F, Cl, N, and S; and
the lithium composite oxide satisfies the following mathematical expression (I): $0.05 \leq$ integrated intensity ratio $I_{(20°\text{-}23°)}/I_{(18°\text{-}20°)} \leq 0.26$.

Here, the integrated intensity ratio $I_{(20°\text{-}23°)}/I_{(18°\text{-}20°)}$ is equal to the ratio of the integrated intensity $I_{(20°\text{-}23°)}$ to the integrated intensity $I_{(18°\text{-}20°)}$;
the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide; and
the integrated intensity $I_{(20°\text{-}23°)}$ is an integrated intensity of a second maximum peak present in a diffraction angle 2θ range of greater than or equal to 20° and less than or equal to 23° in the X-ray diffraction pattern of the lithium composite oxide.

The positive electrode active material in Embodiment 1 is used for improving the capacity of the battery.

The lithium ion battery including the positive electrode active material in Embodiment 1 has a redox potential (Li/Li$^+$ basis) of about 3.4 V. The lithium ion battery has a capacity of about 260 mAh/g or more.

The lithium composite oxide in Embodiment 1 includes a first phase having a crystal structure belonging to space group C2/m and a second phase having a crystal structure belonging to space group R-3m.

The crystal structure belonging to space group C2/m has a structure in which a Li layer and a transition metal layer are alternately stacked. The transition metal layer may contain not only a transition metal but also Li. Accordingly, in the crystal structure belonging to space group C2/ml, the amount of Li that is occluded inside the crystal structure is larger than that in a known material LiCoO$_2$ which is a commonly used.

However, when the transition metal layer is formed from only a crystal structure belonging to space group C2/m, it is inferred that since the mobility barrier of Li in the transition metal layer is high (that is, the diffusibility of Li is low), the capacity is lowered at the time of fast-charging.

On the other hand, since the crystal structure belonging to space group R-3m has a two-dimensional diffusion path of Li. Accordingly, the crystal structure belonging to space group R-3m has a high diffusibility of Li.

Since the lithium composite oxide in Embodiment 1 includes both a crystal structure belonging to space group C2/m and a crystal structure belonging to space group R-3m, a battery having a high capacity can be achieved. It is inferred that the battery is suitable for fast charging.

In the lithium composite oxide in Embodiment 1, a plurality of regions consisting of the first phase and a plurality of regions consisting of the second phase may be randomly arranged three-dimensionally.

Since the three-dimensional random arrangement expands the three-dimensional diffusion path of Li, a large amount of lithium can be inserted and released. As a result, the capacity of the battery is improved.

The lithium composite oxide in Embodiment 1 is a multiphase mixture. For example, a layer structure consisting of a bulk layer and a coating layer coating the bulk layer does not correspond to the multiphase mixture in the present disclosure. The multiphase mixture means a material including a plurality of phases. When the lithium composite oxide is manufactured, a plurality of materials corresponding to these phases may be mixed.

Whether a lithium composite oxide is a multiphase mixture or not can be judged by an X-ray diffraction method and an electron beam diffraction method as described later. Specifically, if the spectra of a lithium composite oxide obtained by the X-ray diffraction method and the electron beam diffraction method include peaks showing the features of a plurality of phases, the lithium composite oxide is judged to be a multiphase mixture.

In the lithium composite oxide in Embodiment 1, the following mathematical expression (1):

$$0.05 \leq \text{integrated intensity ratio} I_{(20°\text{-}23°)}/I_{(18°\text{-}20°)} \leq 0.26 \quad (I)$$

is satisfied.

Here, the integrated intensity ratio $I_{(20°\text{-}23°)}/I_{(18°\text{-}20°)}$ is equal to the ratio of the integrated intensity $I_{(20°\text{-}23°)}$ to the integrated intensity $I_{(18°\text{-}20°)}$;

the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide; and the integrated intensity $I_{(20°\text{-}23°)}$ is an integrated intensity of a second maximum peak present in a diffraction angle 2θ range of greater than or equal to 20° and less than or equal to 23° in the X-ray diffraction pattern of the lithium composite oxide.

The integrated intensity ratio $I_{(20°\text{-}23°)}/I_{(18°\text{-}20°)}$ is a parameter that can be used as an index of the abundance ratio between the first phase and the second phase in the lithium composite oxide of Embodiment 1. It is inferred that the integrated intensity ratio $I_{(20°\text{-}23°)}/I_{(18°\text{-}20°)}$ increases with an increase in the abundance ratio of the first phase. In contrast, it is inferred that the integrated intensity ratio $I_{(20°\text{-}23°)}/I_{(18°\text{-}20°)}$ decreases with an increase in the abundance ratio of the second phase.

When the integrated intensity ratio $I_{(20°\text{-}23°)}/I_{(18°\text{-}20°)}$ is less than 0.05, since the abundance ratio of the first phase is low, it is inferred that the insertion amount and the release amount of Li at the time of charging and discharging decrease. This decrease makes the capacity of the battery insufficient.

When the integrated intensity ratio $I_{(20°\text{-}23°)}/I_{(18°\text{-}20°)}$ is larger than 0.26, since the abundance ratio of the second phase is low, it is inferred that the diffusibility of Li decreases. This decrease also makes the capacity of the battery insufficient.

Thus, since the lithium composite oxide in Embodiment 1 includes a first phase and a second phase and has an integrated intensity ratio $I_{(20°\text{-}23°)}/I_{(18°\text{-}20°)}$ of greater than or equal to 0.05 and less than 0.26, it is possible to insert and release a large amount of Li. Accordingly, it is inferred that the lithium composite oxide in Embodiment 1 has a high diffusibility of Li. It is inferred that a battery including the lithium composite oxide in Embodiment 1 has a high capacity.

In the lithium composite oxide in Embodiment 1, the integrated intensity ratio $I_{(20°\text{-}23°)}/I_{(18°\text{-}20°)}$ may be greater than or equal to 0.09 and less than or equal to 0.14.

A positive electrode active material having an integrated intensity ratio of greater than or equal to 0.09 and less than or equal to 0.14 further improves the capacity.

The lithium composite oxide in Embodiment 1 includes at least one selected from the group consisting of F, Cl, N, and S. The at least one element stabilizes the crystal structure of the lithium composite oxide.

A part of the oxygen atoms of the lithium composite oxide may be substituted with an electrochemically inert anion. In other words, a part of oxygen atoms may be substituted with at least one anion selected from the group consisting of F, Cl, N, and S. It is inferred that this substitution further stabilizes the crystal structure of the lithium composite oxide in Embodiment 1. It is inferred that the crystal lattice is expanded by substituting a part of oxygen with an anion having an ionic radius larger than the radius of an oxygen anion to improve the diffusibility of Li. An example of the anion having an ionic radius larger than the radius of an oxygen anion is at least one anion selected from the group consisting of F, Cl, N, and S. As described above, in the crystal structure including the first phase and the second phase, the crystal structure is further stabilized. It is inferred that, consequently, a larger amount of Li can be inserted and released. Thus, the capacity of the battery is improved.

For example, when the lithium composite oxide in Embodiment 1 does not contain any of F, Cl, N, and S, the redox amount of oxygen is large. Consequently, the crystal structure is easily destabilized by oxygen release. It is inferred that, consequently, the capacity or the cycle characteristics are deteriorated.

The lithium composite oxide in Embodiment 1 may contain F.

Since a fluorine atom has high electronegativity, the substitution of a part of oxygen with a fluorine atom increases the interaction between a cation and an anion to improve the discharge capacity or the operating voltage. For the same reason, electrons are localized due to solid solution of F compared with the case of not containing F. Consequently, the oxygen release at the time of charging is suppressed to stabilize the crystal structure. As described above, in the crystal structure including the first phase and the second phase, the crystal structure is further stabilized. Consequently, a larger amount of Li can be inserted and released. The capacity of the battery is further improved by the total action of these effects.

International Publication No. WO 2014/192759 discloses a lithium composite transition metal oxide. The lithium composite transition metal oxide disclosed in International Publication No. WO 2014/192759 includes space groups R-3m and C2/m, has a chemical composition represented by a formula $Li_aMO_x$ (where, M is an element including at least one selected from a Ni element, a Co element, and a Mn element), and has, in an X-ray diffraction pattern, a ratio of the integrated intensity (I020) of the peak of a (020) plane pertaining to the crystal structure of space group C2/m to the integrated intensity (I003) of the peak of a (003) plane pertaining to the crystal structure of space group R-3m, (I020/I003), of 0.02 to 0.3.

Known technology as in International Publication No. WO 2014/192759 does not disclose or suggest a lithium composite oxide that includes a first phase having a crystal structure belonging to space group C2/m and a second phase having crystal structure belonging to space group R-3m, shows an XRD pattern in which the integrated intensity ratio $I_{(20°-23°)}/I_{(18°-20°)}$ of the integrated intensity $I_{(20°-23°)}$ of a second maximum peak present in a diffraction angle 2θ range of greater than or equal to 20° and less than or equal to 23° to the integrated intensity $I_{(18°-20°)}$ of a first maximum peak present in a diffraction angle 2θ range of greater than or equal to 18° and less than or equal to 20° is greater than or equal to 0.05 and less than or equal to 0.26, and has substitution of a part of oxygen with an anion element (e.g., at least one element of F, Cl, N, and S) having an ionic radius larger than that of oxygen.

That is, the lithium composite oxide in Embodiment 1 cannot be easily conceived from the known technology. The lithium composite oxide in Embodiment 1 further improves the capacity of the battery.

The integrated intensity of an X-ray diffraction peak can be calculated using, for example, the software attached to an XRD (for example, software including PDXL (trade name) attached to a powder X-ray diffractometer, manufactured by Rigaku Corporation). In such a case, the integrated intensity of an X-ray diffraction peak can be obtained by, for example, calculating the area from the height and the half-width of the X-ray diffraction peak.

In general, in an XRD pattern using a CuKα ray, when the crystal structure belongs to space group C2/m, the maximum peak present in a diffraction angle 2θ range of greater than or equal to 18° and less than or equal to 20° reflects a (001) plane. The maximum peak present in a diffraction angle 2θ range of greater than or equal to 20° and less than or equal to 23° reflects a (020) plane.

In general, in an XRD pattern using a CuKα ray, when the crystal structure belongs to space group R-3m, the maximum peak present in a diffraction angle 2θ range of greater than or equal to 18° and less than or equal to 20° reflects a (003) plane. No diffraction peak is present in a diffraction angle 2θ range of greater than or equal to 20° and less than or equal to 23°.

Since the lithium composite oxide in Embodiment 1 includes a first phase having a crystal structure belonging to space group C2/m and a second phase having a crystal structure belonging to space group R-3m, it is not always easy to completely specify the space group that the maximum peak present in a diffraction angle 2θ range of greater than or equal to 18° and less than or equal to 20°.

Accordingly, in addition to the above-described X-ray diffraction measurement, electron beam diffraction measurement using a transmission electron microscope (hereinafter, referred to as "TEM") may be performed. A space group of the lithium composite oxide in Embodiment 1 can be specified by observing an electron beam diffraction pattern by a known procedure. Consequently, it can be verified that the lithium composite oxide in Embodiment 1 includes a first phase having a crystal structure belonging to space group C2/m and a second phase having a crystal structure belonging to space group R-3m.

The lithium composite oxide in Embodiment 1 may be may be a two-phase mixture of the above-described first phase and the above-described second phase.

The two-phase mixture improves the capacity of the battery.

The lithium composite oxide in Embodiment 1 contains not only a lithium atom but also an atom other than the lithium atom. Examples of the atom other than the lithium atom are Mn, Co, Ni, Fe, Cu, V, Nb, Mo, Ti, Cr, Zr, Zn, Na, K, Ca, Mg, Pt, Au, Ag, Ru, W, B, Si, P, and Al. The lithium composite oxide in Embodiment 1 may contain one type of atom as the atom other than lithium atom. Alternatively, the lithium composite oxide in Embodiment 1 may contain two or more types of atom as the atom other than lithium atom.

Me may include not only Mn but also at least one element selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

The lithium composite oxide in Embodiment 1 may contain at least one 3d transition metal element selected from the group consisting of Mn, Co, Ni, Fe, Cu, V, Ti, Cr, and Zn.

The 3d transition metal element improves the capacity of the battery.

The lithium composite oxide in Embodiment 1 may contain at least one element selected from the group consisting of Mn, Co, Ni, and Al.

The at least one element selected from the group consisting of Mn, Co, Ni, and Al improves the capacity of the battery.

The lithium composite oxide in Embodiment 1 may contain Mn.

Since the orbital hybridization of Mn and oxygen is easily formed, oxygen release at the time of charging is suppressed. As described above, in the crystal structure including the first phase and the second phase, the crystal structure is further stabilized. It is inferred that, consequently, a larger amount of Li can be inserted and released. Accordingly, the capacity of the battery can be improved.

Subsequently, an example of the chemical composition of a lithium composite oxide in Embodiment 1 will now be described.

The lithium composite oxide in Embodiment 1 may have an average composition represented by a compositional formula (I): $Li_xMe_yO_\alpha Q_\beta$, where, Me may be at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; and Q may be at least one selected from the group consisting of F, Cl, N, and S.

Furthermore, in the compositional formula (I), the following four mathematical expressions:

$1.05 \leq x \leq 1.5$, $0.6 \leq y \leq 1.0$, $1.2 \leq \alpha \leq 2.0$, and $0 < \beta \leq 0.8$ may be satisfied.

The above-mentioned lithium composite oxide improves the capacity of the battery.

When Me is represented by a chemical formula $Me'_{y1}Me''_{y2}$ (here, Me' and Me'' are each independently at least one selected from the group for Me), "y=y1+y2" is satisfied. For example, when Me is $Mn_{0.6}Co_{0.2}$, "y=0.6+0.2=0.8" is satisfied. Even if Q is composed of two or more elements, it is possible to calculate as in Me.

When x is a value of greater than or equal to 1.05, the amount of Li that can be inserted and released in the positive electrode active material is large. Accordingly, the capacity is improved.

When x is a value of less than or equal to 1.5, the amount of Li that is inserted and released in the positive electrode active material by the redox reaction of Me is large. As a result, there is no need to highly utilize the redox reaction of oxygen. Consequently, the crystal structure is stabilized, resulting in an improvement in the capacity.

When y is a value of greater than or equal to 0.6, the amount of Li that is inserted and released in the positive electrode active material by the redox reaction of Me is large. As a result, there is no need to highly utilize the redox reaction of oxygen. Consequently, the crystal structure is stabilized, resulting in an improvement in the capacity.

When y is a value of less than or equal to 1.0, the amount of Li that can be inserted and released in the positive electrode active material is large. Consequently, the capacity is improved.

When $\alpha$ is a value of greater than or equal to 1.2, the charge compensation amount can be prevented from decreasing by the redox of oxygen. Consequently, the capacity is improved.

When $\alpha$ is a value of less than or equal to 2.0, the capacity can be prevented from becoming excessive by the redox of oxygen, and the crystal structure when Li is released is stabilized. Consequently, the capacity is improved.

When $\beta$ is a value of higher than 0, since Q is electrochemically inert, the crystal structure when Li is released is stabilized. Consequently, the capacity is improved.

When $\beta$ is a value of less than or equal to 0.8, since it is possible to prevent the electrochemically inert influence of Q from increasing, the electron conductivity is improved. Consequently, the capacity is improved.

The "average composition" of the lithium composite oxide in Embodiment 1 is a composition obtained by analyzing the elements of the lithium composite oxide without considering the difference in the composition of each phase of the lithium composite oxide. Typically, it means the composition obtained by elemental analysis using a sample having a size similar to or larger than that of a primary particle of the lithium composite oxide. The first phase and the second phase may have the same chemical composition with each other. Alternatively, the first phase and the second phase may have different compositions from each other.

The above-described average composition can be determined by inductively coupled plasma emission spectrometry, inert gas fusion-infrared absorption analysis, ion chromatography, or a combination thereof.

Since the orbital hybridization of Mn and oxygen is easily formed, oxygen release at the time of charging is suppressed. As described above, in the crystal structure including the first phase and the second phase, the crystal structure is further stabilized. Consequently, the capacity of the battery can be improved.

The molar percentage of Mn in Me may be greater than or equal to 60%. That is, the molar ratio of Mn to the entire Me including Mn (molar ratio of Mn/Me) may be greater than or equal to 0.6 and less than or equal to 1.0.

Since the orbital hybridization of Mn and oxygen is easily formed, oxygen release at the time of charging is further suppressed. As described above, in the crystal structure including the first phase and the second phase, the crystal structure is further stabilized. Consequently, a battery having a higher capacity can be realized.

Me may include at least one element selected from the group consisting of B, Si, P, and Al in such a manner that the molar percentage of the at least one element in Me is less than or equal to 20%.

Since B, Si, P, and Al have high covalency, the crystal structure of the lithium composite oxide in Embodiment 1 is stabilized. As a result, the cycle characteristics are improved, and the life of the battery can be further extended.

Q may include F.

That is, Q may be F.

Alternatively, Q may include not only F but also at least one element selected from the group consisting of Cl, N, and S.

Since a fluorine atom has high electronegativity, the substitution of a part of oxygen with a fluorine atom increases the interaction between a cation and an anion to improve the discharge capacity or the operating voltage. For the same reason, electrons are localized due to solid solution of F compared with the case of not containing F. Consequently, the oxygen release at the time of charging is suppressed to stabilize the crystal structure. As described above, in the crystal structure including the first phase and the second phase, the crystal structure is further stabilized. Consequently, a larger amount of Li can be inserted and released. The capacity of the battery is further improved by the total action of these effects.

The following two mathematical expressions:

$$1.166 \leq x \leq 1.4, \text{ and}$$

$$0.67 \leq y \leq 1.0$$

may be satisfied.

When the above two mathematical expressions are satisfied, the capacity of the battery can be further improved.

The following two mathematical expressions:

$$1.33 \leq \alpha \leq 1.9, \text{ and}$$

$$0.1 \leq \beta \leq 0.67$$

may be satisfied.

When the above two mathematical expressions are satisfied, the capacity can be prevented from becoming excessive by the redox of oxygen. As a result, the influence of the electrochemically inert Q is sufficiently shown to stabilize the crystal structure when Li is released. Thus, the capacity of the battery can be further improved.

The molar ratio of Li to Me is represented by a mathematical expression (x/y).

The molar ratio (x/y) may be greater than or equal to 1.4 and less than or equal to 2.0.

A molar ratio (x/y) of greater than or equal to 1.4 and less than or equal to 2.0 further improves the capacity of the battery.

When the molar ratio (x/y) is higher than 1, for example, the ratio of the number of Li atoms in the lithium composite oxide in Embodiment 1 is higher than the ratio of the number of Li atoms in the known positive electrode active material represented by a compositional formula $LiMnO_2$. Accordingly, it is possible to insert and release a larger amount of Li.

When the molar ratio (x/y) is greater than or equal to 1.4, since the amount of Li that can be used is large, a diffusion path of Li is appropriately formed. Accordingly, when the molar ratio (x/y) is greater than or equal to 1.4, the capacity of the battery is further improved.

When the molar ratio (x/y) is less than or equal to 2.0, it is possible to prevent the redox reaction of usable Me from decreasing. As a result, there is no need to highly utilize the redox reaction of oxygen. A decrease in the Li insertion efficiency at the time of discharging, due to destabilization of the crystal structure when Li is released at the time of charging, is suppressed. Accordingly, the capacity of the battery is further improved.

In order to further improve the capacity of the battery, the molar ratio (x/y) may be greater than or equal to 1.5 and less than or equal to 2.0.

The molar ratio of O to Q is represented by a mathematical expression $(\alpha/\beta)$.

In order to further improve the capacity of the battery, the molar ratio $(\alpha/\beta)$ may be greater than or equal to 2 and less than or equal to 19.

When the molar ratio $(\alpha/\beta)$ is greater than or equal to 2, the charge compensation amount can be prevented from decreasing due to the redox of oxygen. Furthermore, since the influence of the electrochemically inert Q can be reduced, the electron conductivity is improved. Accordingly, the capacity of the battery is further improved.

When the molar ratio $(\alpha/\beta)$ is less than or equal to 19, the capacity can be prevented from becoming excessive due to the redox of oxygen. Consequently, the crystal structure is stabilized when Li is released. Furthermore, the influence of the electrochemically inert Q is shown to stabilize the crystal structure when Li is released. Accordingly, a battery having a higher capacity can be realized.

As described above, the lithium composite oxide in Embodiment 1 may have an average composition represented by a compositional formula $Li_xMe_yO_\alpha Q_\beta$. Accordingly, the lithium composite oxide in Embodiment 1 is composed of a cationic portion and an anionic portion. The cationic portion is composed of Li and Me. The anionic portion is composed of O and Q. The molar ratio of the cationic portion composed of Li and Me to the anionic portion composed of O and Q is represented by a mathematical expression $((x+y)/(\alpha+\beta))$.

The molar ratio $((x+y)/(\alpha+\beta))$ may be greater than or equal to 0.75 and less than or equal to 1.2.

A molar ratio $((x+y)/(\alpha+\beta))$ of greater than or equal to 0.75 and less than or equal to 1.2 further improves the capacity of the battery.

When the molar ratio $((x+y)/(\alpha+\beta))$ is greater than or equal to 0.75, it is possible to prevent that a large amount of impurities are generated when the lithium composite oxide is synthesized, and the capacity of the battery is further improved.

When the molar ratio $((x+y)/(\alpha+\beta))$ is less than or equal to 1.2, since the amount of defect in the anionic portion of the lithium composite oxide is low, the crystal structure is stably maintained even after lithium is desorbed from the lithium composite oxide by charging.

The molar ratio $((x+y)/(\alpha+\beta))$ may be greater than or equal to 1.0 and less than or equal to 1.2.

A molar ratio $((x+y)/(\alpha+\beta))$ of greater than or equal to 1.0 and less than or equal to 1.2 further improves the capacity of the battery.

In the lithium composite oxide in Embodiment 1, a part of Li may be substituted with an alkaline metal such as Na or K.

The positive electrode active material in Embodiment 1 may contain the above-described lithium composite oxide as a main component. In other words, the positive electrode active material in Embodiment 1 may contain the lithium composite oxide such that the mass percentage of the lithium composite oxide in the whole positive electrode active material is greater than or equal to 50%. Such a positive electrode active material further improves the capacity of the battery.

In order to further improve the capacity of the battery, the mass percentage may be greater than or equal to 70%.

In order to further improve the capacity of the battery, the mass percentage may be greater than or equal to 90%.

The positive electrode active material in Embodiment 1 may contain not only the above-described lithium composite oxide but also inevitable impurities.

The positive electrode active material in Embodiment 1 may contain the starting material as an unreacted material. The positive electrode active material in Embodiment 1 may contain a by-product occurring when the lithium composite oxide is synthesized. The positive electrode active material in Embodiment 1 may contain a decomposition product generated by decomposition of the lithium composite oxide.

The positive electrode active material in Embodiment 1 may contain only the lithium composite oxide except for inevitable impurities.

The positive electrode active material containing only the lithium composite oxide further improves the capacity of the battery.

Method for Producing Lithium Composite Oxide

An example of a method for manufacturing a lithium composite oxide contained in the positive electrode active material of Embodiment 1 will now be described.

The lithium composite oxide in Embodiment 1 is produced by, for example, the following method.

A raw material including Li, a raw material including Me, and a raw material including Q are prepared.

Examples of the raw material including Li include lithium oxides, such as $Li_2O$ and $Li_2O_2$; lithium salts, such as LiF, $Li_2CO_3$, and LiOH; and lithium composite oxides, such as $LiMeO_2$ and $LiMe_2O_4$.

Examples of the raw material including Me include metal oxides, such as $Me_2O_3$; metal salts, such as $MeCO_3$ and $MeNO_3$; metal hydroxides, such as $Me(OH)_2$ and MeOOH; and lithium composite oxides, such as $LiMeO_2$ and $LiMe_2O_4$.

When Me is Mn, examples of the raw material including Mn include manganese oxides, such as $MnO_2$ and $Mn_2O_3$; salts, such as $MnCO_3$ and $MnNO_3$; hydroxides, such as $Mn(OH)_2$ and MnOOH; and lithium composite oxides, such as $LiMnO_2$ and $LiMn_2O_4$.

Examples of the raw material including Q include halogenated lithium, transition metal halides, transition metal sulfides, and transition metal nitrides.

When Q is F, examples of the raw material including F include LiF and transition metal fluorides.

The method for manufacturing the lithium composite oxide includes a first mechanochemical reaction step and a second mechanochemical reaction step. In the first mechanochemical reaction step, raw materials are weighed, for example, such that the Li molar ratio is 0.8 times the molar ratio shown in the above-mentioned compositional formula (I). The raw materials are mixed by, for example, a dry method or a wet method and are then mechanochemically reacted with each other in a mixer, such as a planetary ball mill, for longer than or equal to 10 hours to obtain a first precursor.

In the second mechanochemical reaction step, a Li compound (e.g., LiF) is weighed such that the Li molar ratio is equal to the molar ratio shown in the above-mentioned compositional formula (I). The first precursor and the Li compound are mixed and are then mechanochemically reacted again, for example, for 3 hours. Thus, a second precursor is obtained.

Thus, the values of x, y, α, and β can be changed within the ranges shown in the compositional formula (I).

Subsequently, the resulting second precursor is heat-treated. The conditions of the heat treatment are appropriately set such that the lithium composite oxide in Embodiment 1 is obtained. The optimum conditions of the heat treatment depend on other manufacturing conditions and the target composition.

The temperature of the heat treatment can be appropriately changed, for example, within a range of 200° C. to 900° C. The time for the heat treatment can be appropriately changed, for example, within a range of 1 minute to 20 hours.

Examples of the atmosphere of the heat treatment are an air atmosphere, an oxygen atmosphere, and an inert atmosphere (for example, a nitrogen atmosphere or an argon atmosphere).

The present inventors have found that the value of integrated intensity ratio $I_{(20°-23°)}/I_{(18°-20°)}$ decreases with a decrease in the amount of the raw material of Li used for the first mechanochemical reaction step. Based on this finding, the production conditions can be determined.

As described above, the lithium composite oxide in Embodiment 1 can be obtained by adjusting the raw materials, the mixing conditions (e.g., the mixing ratio or the reaction time of the mechanochemical reaction), and the heat treatment conditions.

The space group of the crystal structure of a resulting lithium composite oxide can be specified by, for example, an X-ray diffraction measuring method or an electron beam diffraction measuring method. Consequently, it can be verified that the resulting lithium composite oxide includes a first phase having a crystal structure belonging to space group C2/m and a second phase having a crystal structure belonging to space group R-3m.

The average composition of a resulting lithium composite oxide is determined by, for example, ICP emission spectrometry, inert gas fusion-infrared absorption analysis, ion chromatography, or a combination thereof.

When a lithium-transition metal composite oxide is used as a raw material, the energy of mixing the elements can be decreased. Consequently, the purity of the lithium composite oxide in Embodiment 1 is increased.

As described above, the method for manufacturing a lithium composite oxide of Embodiment 1 includes a step (a) of preparing raw materials, a step (b) of mechanochemically reacting the raw materials to obtain a precursor of the lithium composite oxide, and a step (c) of heating the precursor to obtain a lithium composite oxide.

The raw materials may be a raw material mixture. In the raw material mixture, the ratio of Li to Me may be greater than or equal to 1.4 and less than or equal to 2.0.

In the step (a), a raw material mixture may be prepared by mixing raw materials such that the molar ratio of Li to Me is greater than or equal to 1.5 and less than or equal to 2.0.

The step (b) can include a first mechanochemical reaction step and a second mechanochemical reaction step as described above. That is, in the first mechanochemical reaction step, raw materials (e.g., LiF, Li$_2$O, a transition metal oxide, or a lithium composite transition metal) are mixed to prepare a first precursor, and then in the second mechanochemical reaction step, a Li compound is added to the first precursor to prepare a second precursor. The second precursor is heated as a precursor in the step (c).

Embodiment 2

Embodiment 2 will now be described. The description overlapping with the above-described Embodiment 1 can be omitted.

The battery in Embodiment 2 includes a positive electrode containing the positive electrode active material in Embodiment 1, a negative electrode, and an electrolyte.

The battery in Embodiment 2 has a high capacity.

In the battery in Embodiment 2, the negative electrode may include a negative electrode active material that can occlude and release lithium ions. Alternatively, the negative electrode may include, for example, a material where lithium metal is dissolved from the material into an electrolyte at the time of discharging and precipitates on the material at the time of charging.

In the battery in Embodiment 2, the electrolyte may be a nonaqueous electrolyte (for example, nonaqueous electrolyte solution).

In the battery in Embodiment 2, the electrolyte may be a solid electrolyte.

Figure 1:
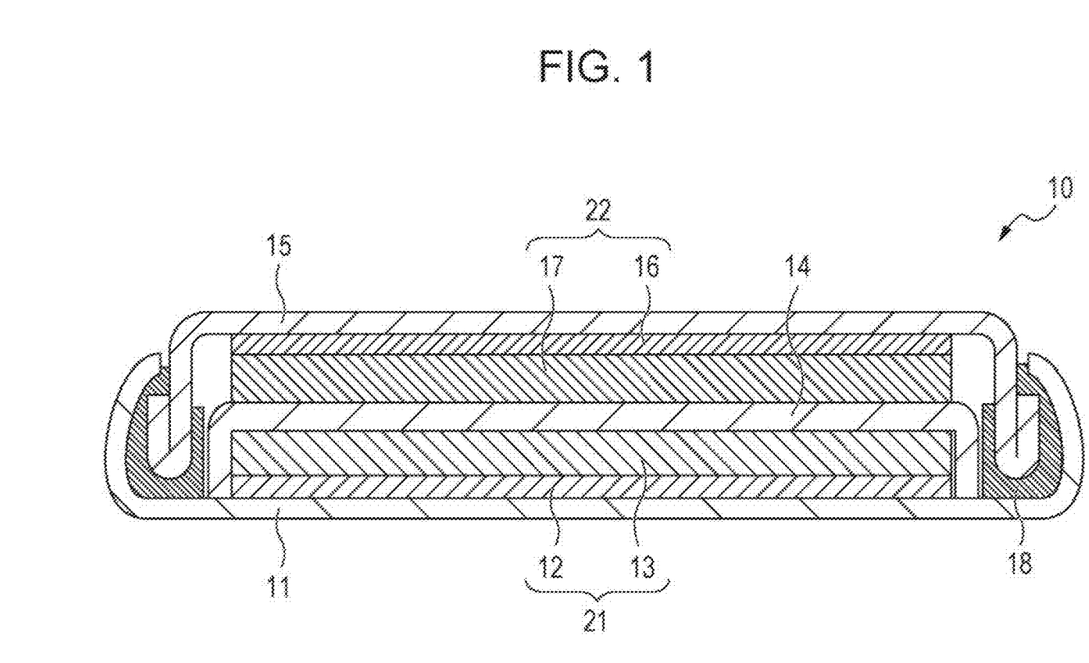
FIG. 1 illustrates a cross-sectional view of a battery 10 in Embodiment 2.

FIG. 1 shows a cross-sectional view of a battery 10 in Embodiment 2.

As shown in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a nonaqueous electrolyte (for example, a nonaqueous electrolyte solution).

The positive electrode 21, the negative electrode 22, and the separator 14 form an electrode group.

The electrode group is accommodated in the case 11.

The case 11 is sealed with the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, nickel, iron, titanium, copper, palladium, gold, or platinum) or an alloy thereof.

The positive electrode current collector 12 may not be provided. In such a case, the case 11 is used as a positive electrode current collector.

The positive electrode active material layer 13 includes the positive electrode active material in Embodiment 1.

The positive electrode active material layer 13 may contain an additive (conductive agent, ionic conductivity auxiliary agent, or binding agent) as needed.

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, nickel, iron, titanium, copper, palladium, gold, or platinum) or an alloy thereof.

The negative electrode current collector 16 may not be provided. In such a case, the sealing plate 15 is used as a negative electrode current collector.

The negative electrode active material layer 17 contains a negative electrode active material.

The negative electrode active material layer 17 may contain, for example, an additive (conductive agent, ionic conductivity auxiliary agent, or binding agent) as needed.

Examples of the material of the negative electrode active material are metal materials, carbon materials, oxides, nitrides, tin compounds, and silicon compounds.

The metal material may be a single metal. Alternatively, the metal material may be an alloy. Examples of the metal material include lithium metal and lithium alloys.

Examples of the carbon material include natural graphite, coke, graphitizing carbon, carbon fibers, spherical carbon, artificial graphite, and amorphous carbon.

From the viewpoint of capacity density, as the negative electrode active material, silicon, tin, a silicon compound, or a tin compound can be used. The silicon compound and the tin compound may be alloys or solid solutions.

As an example of the silicon compound, $SiO_x$ (here, $0.05<x<1.95$) is mentioned. A compound obtained by substituting a part of silicon atoms of $SiO_x$ with another element can also be used. Such a compound is an alloy or a solid solution. The element as another element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (here, $0<x<2$), $SnO_2$, and $SnSiO_3$. One tin compound selected from these compounds may be used alone. Alternatively, a combination of two or more tin compounds selected from these compounds may be used.

The shape of the negative electrode active material is not limited. As the negative electrode active material, a negative electrode active material having a known shape (e.g., particulate or fibrous shape) can be used.

The method for filling (i.e., occluding) the negative electrode active material layer 17 with lithium is not limited. Specifically, examples of the method are a method (a) in which lithium is deposited on a negative electrode active material layer 17 by a gas phase method, such as a vacuum evaporation method, and a method (b) in which lithium metal foil and a negative electrode active material layer 17 are brought into contact with each other and are then heated. In both methods, lithium is diffused in the negative electrode active material layer 17 by heat. A method in which lithium is electrochemically occluded in the negative electrode active material layer 17 can also be used. Specifically, a battery is assembled using a negative electrode 22 not including lithium and lithium metal foil (negative electrode). Subsequently, the battery is charged such that the negative electrode 22 occludes lithium.

Examples of the binding agents of the positive electrode 21 and the negative electrode 22 are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose.

Other examples of the binding agent are copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

A mixture of two or more binding agents selected from the above-mentioned materials may be used.

Examples of the conductive agents of the positive electrode 21 and the negative electrode 22 are graphite, carbon black, a conductive fiber, graphite fluoride, metal powder, a conductive whisker, a conductive metal oxide, and an organic conductive material.

Examples of the graphite include natural graphite and artificial graphite.

Examples of the carbon black include acetylene black, ketjen black, channel black, furnace black, lamp black, and thermal black.

Examples of the metal powder include aluminum powder.

Examples of the conductive whisker include a zinc oxide whisker and a potassium titanate whisker.

Examples of the conductive metal oxide include titanium oxide.

Examples of the organic conductive material include a phenylene derivative.

The surface of the binding may be at least partially coated with a conductive agent. For example, the surface of the binding agent may be coated with carbon black. Consequently, the capacity of the battery can be improved.

The material of the separator 14 is a material having high ion permeability and sufficient mechanical strength. Examples of the material of the separator 14 include a microporous thin film, woven fabric, and nonwoven fabric. Specifically, the separator 14 is desirably made of polyolefin, such as polypropylene or polyethylene. The separator 14 made of polyolefin not only has excellent durability but also can show a shutdown function when excessively heated. The thickness of the separator 14 is within a range of, for example, 10 to 300 μm (or 10 to 40 μm). The separator 14 may be a monolayer film made of a single material. Alternatively, the separator 14 may be a composite film (or multilayer film) made of two or more materials. The porosity of the separator 14 is within a range of, for example, 30% to 70% (or 35% to 60%). The term "porosity" means the percentage of the volume of holes in the total volume of the separator 14. The porosity is measured by, for example, a mercury intrusion method.

The nonaqueous electrolyte solution includes a nonaqueous solvent and a lithium salt dissolved in the nonaqueous solvent.

Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent.

Examples of the cyclic carbonate ester solvent are ethylene carbonate, propylene carbonate, and butylene carbonate.

Examples of the chain carbonate ester solvent are dimethyl carbonate, ethyl methyl carbonate, and diethyl carbonate.

Examples of the cyclic ether solvent are tetrahydrofuran, 1,4-dioxane, and 1,3-dioxolane.

Examples of the chain ether solvent are 1,2-dimethoxyethane and 1,2-diethoxyethane.

An example of the cyclic ester solvent is γ-butyrolactone.

An example of the chain ester solvent is methyl acetate.

Examples of the fluorine solvent are fluoroethylene carbonate, methyl fluoropropionate, fluorobenzene, fluoroethyl methyl carbonate, and fluorodimethylene carbonate.

As the nonaqueous solvent, one nonaqueous solvent selected from these solvents can be used alone. Alternatively, as the nonaqueous solvent, a combination of two or more nonaqueous solvents selected from these solvents can be used.

The nonaqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate.

The nonaqueous electrolyte solution containing at least one fluorine solvent has improved oxidation resistance.

As a result, even when the battery 10 is charged with a high voltage, the battery 10 can be stably operated.

In the battery in Embodiment 2, the electrolyte may be a solid electrolyte.

Examples of the solid electrolyte are an organic polymer solid electrolyte, an oxide solid electrolyte, and a sulfide solid electrolyte.

An example of the organic polymer solid electrolyte is a compound of a polymer compound and a lithium salt. An example of such a compound is lithium polystyrene sulfonate.

The polymer compound may have an ethylene oxide structure. Since the polymer compound has an ethylene oxide structure, a large amount of lithium salt can be contained. As a result, the ionic conductivity can be further increased.

Examples of the oxide solid electrolyte are
(i) an NASICON solid electrolyte such as $LiTi_2(PO_4)_3$ or a substitute thereof;
(ii) a perovskite solid electrolyte such as $(LaLi)TiO_3$;
(iii) an LISICON solid electrolyte such as $Li_{14}ZnGe_4O_{16}$, $Li_4SiO_4$, $LiGeO_4$, or a substitute thereof;
(iv) a garnet solid electrolyte such as $Li_7La_3Zr_2O_{12}$ or a substitute thereof;
(v) $Li_3N$ or an H-substitute thereof; and
(vi) $Li_3PO_4$ or an N-substitute thereof.

Examples of the sulfide solid electrolyte are $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$. When the solid electrolyte is a sulfide solid electrolyte, LiX (X is F, Cl, Br, or I), $MO_y$, or $Li_xMo_y$ (M is P, Si, Ge, B, Al, Ga, or In, and x and y are each independently a natural number) may be added to the sulfide solid electrolyte.

Among them, sulfide solid electrolytes have high moldability and high ionic conductivity. Accordingly, the energy density of the battery can be further improved by using a sulfide solid electrolyte as the solid electrolyte.

Among sulfide solid electrolytes, in particular, $Li_2S-P_2S_5$ has high electrochemical stability and high ionic conductivity. Accordingly, when $Li_2S-P_2S_5$ is used as the solid electrolyte, the energy density of the battery can be further improved.

The solid electrolyte layer containing a solid electrolyte may further contain the above-described nonaqueous electrolyte solution.

Since the solid electrolyte layer contains a nonaqueous electrolyte solution, movement of lithium ions between the active material and the solid electrolyte is easy. As a result, the energy density of the battery can be further improved.

The solid electrolyte layer may contain a gel electrolyte or an ionic liquid.

An example of the gel electrolyte is a polymer material impregnated with a nonaqueous electrolyte solution. Examples of the polymer material are polyethylene oxide, polyacrylonitrile, polyvinylidene fluoride, and polymethyl acrylate. Another example of the polymer material is a polymer having an ethylene oxide bond.

Examples of the cation contained in the ionic liquid are
(i) a cation of an aliphatic chain quaternary ammonium salt such as tetraalkylammonium;
(ii) a cation of an aliphatic chain quaternary phosphonium salt such as tetraalkylphosphonium;
(iii) an aliphatic cyclic ammonium such as pyrrolidinium, morpholinium, imidazolinium, tetrahydropyrimidinium, piperazinium, and piperidinium; and
(iv) a nitrogen-containing heterocyclic aromatic cation such as pyridinium and imidazolium.

Examples of the anion contained in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt can be used alone. Alternatively, a mixture of two or more lithium salts can be used. The concentration of the lithium salt is within a range of, for example, 0.5 to 2 mol/L.

Regarding the shape of the battery in Embodiment 2, the battery is a coin type battery, a cylindrical type battery, a square type battery, a sheet type battery, a button type battery (i.e., button type cell), a flat type battery, or a stacked type battery.

EXAMPLES

Example 1

Production of Positive Electrode Active Material

A mixture of LiF, $MnO_2$, $LiMnO_2$, $LiCoO_2$, and $LiNiO_2$ was prepared such that the Li/Mn/Co/Ni/O/F molar ratio was 1.0/0.54/0.13/0.13/1.8/0.1.

The mixture was put in a container having a volume of 45 mL together with an appropriate amount of zirconia balls having a diameter of 3 mm, followed by sealing in an argon glove box. The container used was of made of zirconia.

Subsequently, a first mechanochemical reaction was carried out. Specifically, in the first mechanochemical reaction, the container was taken out from the argon glove box. The mixture contained in the container was treated with a planetary ball mill at a rotating speed of 600 rpm for 30 hours in an argon atmosphere to produce a first precursor.

The first precursor was mixed with LiF at a molar ratio of L/Mn/Co/Ni/O/F=1.2/0.54/0.13/0.13/1.9/0.1 to prepare a second precursor.

The second precursor was put in a container having a volume of 45 mL together with an appropriate amount of zirconia balls having a diameter of 3 mm, followed by sealing in an argon glove box. The container used was of made of zirconia.

Subsequently, a second mechanochemical reaction was carried out. Specifically, in the second mechanochemical reaction, the container was taken out from the argon glove box. The mixture contained in the container was treated with a planetary ball mill at a rotating speed of 600 rpm for 5 hours in an argon atmosphere to produce a second precursor.

The second precursor was subjected to powder X-ray diffraction measurement.

Based on the result of the powder X-ray diffraction measurement, the space group of the second precursor was specified as Fm-3m.

Subsequently, the second precursor was heated at 700° C. for 1 hour in an air atmosphere. A positive electrode active material of Example 1 was thus obtained.

The active material of Example 1 was subjected to powder X-ray diffraction measurement.

Figure 2:
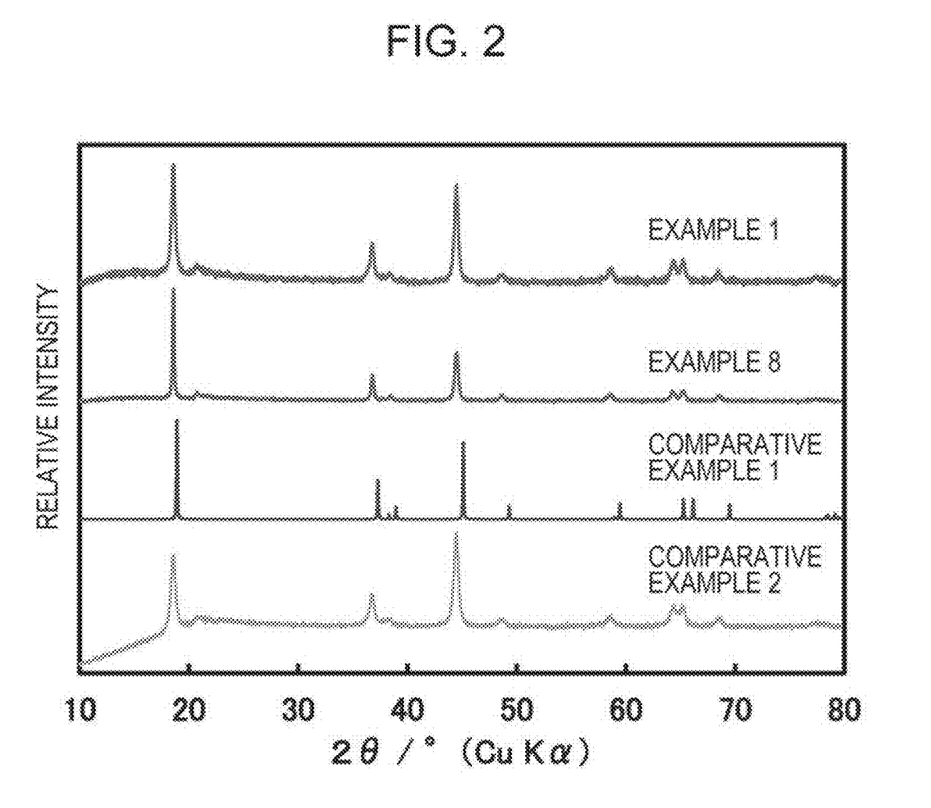
FIG. 2 is a graph showing X-ray diffraction patterns of positive electrode active materials of Examples 1 and 8 and Comparative Examples 1 and 2.

FIG. 2 shows the results of the powder X-ray diffraction measurement.

The positive electrode active material of Example 1 was also subjected to electron diffraction measurement. Based on the results of the powder X-ray diffraction measurement and the electron diffraction measurement, the crystal structure of the positive electrode active material of Example 1 was analyzed.

As a result, it was judged that the positive electrode active material of Example 1 was a two-phase mixture of a phase belonging to space group C2/m and a phase belonging to space group R-3m.

The integrated intensity of an X-ray diffraction peak was calculated from the result of the powder X-ray diffraction measurement with an X-ray diffractometer (manufactured by Rigaku Corporation) by the software (trade name: PDXL) attached to the X-ray diffractometer.

The integrated intensity ratio $I_{(20°-23°)}/I_{(18°-20°)}$ of the positive electrode active material in Example 1 was 0.12.

Production of Battery

Subsequently, 70 parts by mass of the positive electrode active material of Example 1, 20 parts by mass of acetylene black, 10 parts by mass of polyvinylidene fluoride (hereinafter, referred to as "PVDF"), and an appropriate amount of N-methyl-2-pyrrolidone were mixed. Consequently, a positive electrode mixture slurry was prepared. The acetylene black functioned as a conductive agent. The polyvinylidene fluoride functioned as a binding agent.

The positive electrode mixture slurry was applied to one surface of a positive electrode current collector made of aluminum foil having a thickness of 20 μm.

The positive electrode mixture slurry was dried and rolled to obtain a positive electrode plate having a thickness of 60 μm including a positive electrode active material layer.

The resulting positive electrode plate was punched to obtain a circular positive electrode having a diameter of 12.5 mm.

Lithium metal foil having a thickness of 300 μm was punched to obtain a circular negative electrode having a diameter of 14 mm.

Separately, fluoroethylene carbonate (hereinafter, referred to as "FEC"), ethylene carbonate (hereinafter, referred to as "EC"), and ethyl methyl carbonate (hereinafter, referred to as "EMC") were mixed at a volume ratio of 1:1:6 to obtain a nonaqueous solvent.

$LiPF_6$ was dissolved in this nonaqueous solvent at a concentration of 1.0 mol/L to obtain a nonaqueous electrolyte solution.

A separator was impregnated with the resulting nonaqueous electrolyte solution. The separator used was a product of Celgard LLC (P/No. 2320, thickness: 25 μm). The separator was a three-layer separator composed of a polypropylene layer, a polyethylene layer, and a polypropylene layer.

A coin type battery having a diameter of 20 mm and a thickness of 3.2 mm was produced using the above-described positive electrode, negative electrode, and separator in a dry box maintained at a dew point of −50° C.

Examples 2 to 9

In Examples 2 to 9, positive electrode active materials were prepared as in Example 1 except the following items (i) and (ii):
(i) the mixing ratio of the materials used in at least one of the first mechanochemical reaction and the second mechanochemical reaction was changed, and
(ii) the heating conditions were changed within a range of 500° C. to 900° C. and a range of 10 minutes to 10 hours.

Table 1 shows the average compositions of the positive electrode active materials of Examples 2 to 9.

The positive electrode active materials of Examples 2 to 9 were two-phase mixtures of a phase belonging to space group C2/m and a phase belonging to space group R-3m.

Coin type batteries of Examples 2 to 9 were produced as in Example 1 except that the positive electrode active materials of Examples 2 to 9 were used.

Comparative Example 1

In Comparative Example 1, a positive electrode active material having a composition represented by a chemical formula $LiCoO_2$ (i.e., lithium cobaltate) was prepared using a known procedure.

The resulting positive electrode active material was subjected to powder X-ray diffraction measurement.

The result of the powder X-ray diffraction measurement is shown in FIG. 2.

Based on the result of the powder X-ray diffraction measurement, the space group of the positive electrode active material of Comparative Example 1 was specified as space group R-3m.

The intensity ratio $I_{(20°-23°)}/I_{(18°-20°)}$ in the positive electrode active material of Comparative Example 1 was 0.

A coin type battery of Comparative Example 1 was produced as in Example 1 except that the positive electrode active material of Comparative Example 1 was used.

Comparative Example 2

A mixture of LiF, MnO, and $Mn_2O_3$ was prepared such that the L/Mn/O/F molar ratio was 1.33/0.67/1.33/0.67.

The mixture was put in a container having a volume of 45 mL together with an appropriate amount of zirconia balls having a diameter of 3 mm, followed by sealing in an argon glove box. The container used was of made of zirconia.

Subsequently, the container was taken out from the argon glove box. The mixture contained in the container was treated with a planetary ball mill at a rotating speed of 600 rpm for 30 hours in an argon atmosphere to prepare a precursor.

The precursor was subjected to powder X-ray diffraction measurement.

Based on the result of the powder X-ray diffraction measurement, the space group of the precursor was specified as space group Fm-3m.

Subsequently, the precursor was heat-treated at 700° C. for 1 hour in an air atmosphere. A positive electrode active material of Comparative Example 2 was thus obtained.

The positive electrode active material of Comparative Example 2 was subjected to powder X-ray diffraction measurement.

The result of the measurement is shown in FIG. 2.

The positive electrode active material of Comparative Example 2 was subjected to electron diffraction measurement to analyze the crystal structure.

The positive electrode active material of Comparative Example 2 was a two-phase mixture of a phase belonging to space group C2/m and a phase belonging to space group R-3m.

The integrated intensity ratio $I_{(20°-23°)}/I_{(18°-20°)}$ in the positive electrode active material of Comparative Example 2 was 0.27.

A coin type battery of Comparative Example 2 was produced as in Example 1 except that the positive electrode active material of Comparative Example 2 was used.

Comparative Example 3

A mixture of $MnO_2$, $LiMnO_2$, $LiCoO_2$, and $LiNiO_2$ was prepared such that the LiMn/Co/Ni/O molar ratio was 1.0/0.54/0.13/0.13/2.0.

The mixture was put in a container having a volume of 45 mL together with an appropriate amount of zirconia balls having a diameter of 3 mm, followed by sealing in an argon glove box. The container used was of made of zirconia.

Subsequently, the container was taken out from the argon glove box. The mixture contained in the container was treated with a planetary ball mill at a rotating speed of 600 rpm for 30 hours in an argon atmosphere to produce a first precursor.

The first precursor was mixed with LiF at a molar ratio of L/Mn/Co/Ni/O=1.2/0.54/0.13/0.13/2.0 to prepare a second precursor.

The second precursor was put in a container having a volume of 45 mL together with an appropriate amount of zirconia balls having a diameter of 3 mm, followed by sealing in an argon glove box. The container used was of made of zirconia.

Subsequently, a second mechanochemical reaction was carried out. Specifically, in the second mechanochemical reaction, the container was taken out from the argon glove box. The mixture contained in the container was treated with a planetary ball mill at a rotating speed of 600 rpm for 5 hours in an argon atmosphere to produce a second precursor.

The second precursor was subjected to powder X-ray diffraction measurement.

The space group of the second precursor was Fm-3m.

Subsequently, the second precursor was heated at 700° C. for 1 hour in an air atmosphere. A positive electrode active material of Comparative Example 3 was thus obtained.

The positive electrode active material of Comparative Example 3 was subjected to powder X-ray diffraction measurement.

In addition, the positive electrode active material of Comparative Example 3 was also subjected to electron diffraction measurement. Based on the results of the powder X-ray diffraction measurement and the electron diffraction measurement, the crystal structure of the positive electrode active material of Comparative Example 3 was analyzed.

As a result, the positive electrode active material of Comparative Example 3 was specified to be a two-phase mixture of a phase belonging to space group C2/m and a phase belonging to space group R-3m.

The integrated intensity ratio $I_{(20°-23°)}/I_{(18°-20°)}$ of the positive electrode active material in Comparative Example 3 was 0.27.

A coin type battery of Comparative Example 3 was produced as in Example 1 except that the positive electrode active material of Comparative Example 3 was used.

Evaluation of Battery

The battery of Example 1 was charged up to a voltage of 4.9 V at a current density of 0.5 $mA/cm^2$.

Subsequently, the battery of Example 1 was discharged down to a voltage of 2.5 V at a current density of 0.5 $mA/cm^2$.

The initial discharge capacity of the battery of Example 1 was 285 mAh/g.

The battery of Comparative Example 1 was charged up to a voltage of 4.3 V at a current density of 0.5 $mA/cm^2$.

Subsequently, the battery of Comparative Example 1 was discharged down to a voltage of 2.5 V at a current density of 0.5 $mA/cm^2$.

The initial discharge capacity of the battery of Comparative Example 1 was 150 mAh/g.

The initial discharge capacities of the coin type batteries of Examples 2 to 9 and Comparative Examples 2 and 3 were similarly measured.

The following Tables 1 and 2 show the results of Examples 1 to 9 and Comparative Examples 1 to 3.

TABLE 1

| | Average composition | x/y | α/β | (x + y)/(α + β) |
|---|---|---|---|---|
| Example 1 | $Li_{1.2}Mn_{0.54}Co_{0.13}Ni_{0.13}O_{1.9}F_{0.1}$ | 1.5 | 19 | 1 |
| Example 2 | $Li_{1.2}Mn_{0.54}Co_{0.13}Ni_{0.13}O_{1.9}F_{0.1}$ | 1.5 | 19 | 1 |
| Example 3 | $Li_{1.2}Mn_{0.54}Co_{0.13}Ni_{0.13}O_{1.9}F_{0.1}$ | 1.5 | 19 | 1 |
| Example 4 | $Li_{1.166}Mn_{0.5}Co_{0.167}Ni_{0.167}O_{1.9}F_{0.1}$ | 1.4 | 19 | 1 |
| Example 5 | $Li_{1.166}Mn_{0.5}Co_{0.167}Ni_{0.167}O_{1.9}F_{0.1}$ | 1.4 | 19 | 1 |
| Example 6 | $Li_{1.2}Mn_{0.54}Co_{0.11}Ni_{0.11}Al_{0.04}O_{1.9}F_{0.1}$ | 1.5 | 19 | 1 |
| Example 7 | $Li_{1.33}Mn_{0.67}O_{1.33}F_{0.67}$ | 2 | 2 | 1 |
| Example 8 | $Li_{1.2}Mn_{0.54}Co_{0.13}Ni_{0.13}O_{1.9}F_{0.1}$ | 1.5 | 19 | 1 |
| Example 9 | $Li_{1.4}Mn_{0.6}Co_{0.2}Ni_{0.2}O_{1.9}F_{0.1}$ | 1.4 | 19 | 1.2 |
| Comparative Example 1 | $LiCoO_2$ | 1 | — | 1 |
| Comparative Example 2 | $Li_{1.33}Mn_{0.67}O_{1.33}F_{0.67}$ | 2 | 2 | 1 |
| Comparative Example 3 | $Li_{1.2}Mn_{0.54}Co_{0.13}Ni_{0.13}O_{2.0}$ | 1.5 | — | 1 |

TABLE 2

| | Space group | $I_{(20°-23°)}/I_{(18°-20°)}$ | Initial discharge capacity |
|---|---|---|---|
| Example 1 | C2/m R-3m | 0.12 | 285 |
| Example 2 | C2/m R-3m | 0.14 | 278 |
| Example 3 | C2/m R-3m | 0.10 | 274 |
| Example 4 | C2/m R-3m | 0.09 | 283 |
| Example 5 | C2/m R-3m | 0.05 | 272 |
| Example 6 | C2/m R-3m | 0.12 | 280 |
| Example 7 | C2/m R-3m | 0.25 | 270 |
| Example 8 | C2/m R-3m | 0.26 | 266 |
| Example 9 | C2/m R-3m | 0.07 | 263 |
| Comparative Example 1 | R-3m | 0 | 150 |
| Comparative Example 2 | C2/m R-3m | 0.27 | 240 |
| Comparative Example 3 | C2/m R-3m | 0.12 | 260 |

As shown in Tables 1 and 2, the batteries of Examples 1 to 9 each have an initial discharge capacity of 263 to 285 mAh/g.

That is, the initial discharge capacities of the batteries of Examples 1 to 9 are larger than those of the batteries of Comparative Examples 1 to 3.

Reasons for this may be the following three items (i) to (iii):

(i) in the batteries of Examples 1 to 9, the lithium composite oxide contained in the positive electrode active material includes a first phase having a crystal structure belonging to space group C2/m and a second phase having a crystal structure belonging to space group R-3m;

(ii) in the batteries of Examples 1 to 9, the lithium composite oxide contains at least one selected from the group consisting of F, Cl, N, and S; and (iii) in the batteries of Examples 1 to 9, the integrated intensity ratio $I_{(20°\text{-}23°)}/I_{(18°\text{-}20°)}$ is greater than or equal to 0.05 and less than or equal to 0.26.

It is inferred that because of the above-mentioned reasons, a large amount of Li can be inserted and released, and the diffusibility of Li and the stability of the crystal structure are high. It is inferred that, consequently, the initial discharge capacity was considerably improved.

In Comparative Example 1, the integrated intensity ratio $I_{(20°\text{-}23°)}/I_{(18°\text{-}20°)}$ is less than 0.05 (i.e., the integrated intensity ratio $I_{(20°\text{-}23°)}/I_{(18°\text{-}20°)}$ is equal to 0). The crystal structure is a single phase of space group R-3m. The value of (x/y) is equal to 1. It is inferred that because of these reasons, the insertion amount and the release amount of Li at the time of charging and discharging were decreased, and the initial discharge capacity was considerably decreased.

In Comparative Example 2, since the integrated intensity ratio $I_{(20°\text{-}23°)}/I_{(18°\text{-}20°)}$ is greater than 0.26 (i.e., the integrated intensity ratio $I_{(20°\text{-}23°)}/I_{(18°\text{-}20°)}$ is equal to 0.27), the abundance ratio of the second phase is small. It is inferred that, consequently, the diffusibility of Li at the time of charging and discharging was decreased, and the initial discharge capacity was decreased.

In Comparative Example 3, since the lithium composite oxide contained in the positive electrode active material does not contain F, the crystal structure is destabilized. It is inferred that as a result, the crystal structure was collapsed with the release of Li at the time of charging and the initial discharge capacity was reduced.

As shown in Tables 1 and 2, the initial discharge capacity of the battery of Example 2 is smaller than that of the battery of Example 1.

A reason for this may be that in Example 2, the integrated intensity ratio $I_{(20°\text{-}23°)}/I_{(18°\text{-}20°)}$ is large compared with that in Example 1. It is inferred that, consequently, the abundance ratio of the second phase was small and the diffusibility of Li at the time of charging and discharging were decreased. It is inferred that, consequently, the initial discharge capacity was decreased.

As shown in Tables 1 and 2, the initial discharge capacity of the battery of Example 3 is smaller than that of the battery of Example 1.

A reason for this may be that in Example 3, the integrated intensity ratio $I_{(20°\text{-}23°)}/I_{(18°\text{-}20°)}$ is small compared with that in Example 1. It is inferred that, consequently, the abundance ratio of the first phase was small and the insertion amount and the release amount of Li at the time of charging and discharging were decreased. It is inferred that, consequently, the initial discharge capacity was decreased.

As shown in Tables 1 and 2, the initial discharge capacity of the battery of Example 4 is smaller than that of the battery of Example 1.

A reason for this may be that in Example 4, the integrated intensity ratio $I_{(20°\text{-}23°)}/I_{(18°\text{-}20°)}$ is small compared with that in Example 1. It is inferred that, consequently, the abundance ratio of the first phase was small and the insertion amount and the release amount of Li at the time of charging and discharging were decreased. It is inferred that in Example 4, since the x/y was small compared with that in Example 1, the insertion amount and the release amount of Li at the time of charging and discharging were decreased. It is inferred that, consequently, the initial discharge capacity was decreased.

As shown in Tables 1 and 2, the initial discharge capacity of the battery of Example 5 is smaller than that of the battery of Example 4.

A reason for this may be that in Example 5, the integrated intensity ratio $I_{(20°\text{-}23°)}/I_{(18°\text{-}20°)}$ is small compared with that in Example 4. It is inferred that, consequently, the abundance ratio of the first phase was small and the insertion amount and the release amount of Li at the time of charging and discharging were decreased. It is inferred that, consequently, the initial discharge capacity was decreased.

As shown in Tables 1 and 2, the initial discharge capacity of the battery of Example 6 is smaller than that of the battery of Example 1.

A reason for this may be that Al contained in the positive electrode active material of the battery of Example 6 does not contribute to the redox reaction. It is inferred that, consequently, the insertion amount and the release amount of Li at the time of charging and discharging were decreased. It is inferred that, consequently, the initial discharge capacity was decreased.

As shown in Tables 1 and 2, the initial discharge capacity of the battery of Example 7 is smaller than that of the battery of Example 2.

A reason for this may be that in Example 7, the integrated intensity ratio $I_{(20°\text{-}23°)}/I_{(18°\text{-}20°)}$ is large compared with that in Example 2. It is inferred that, consequently, the abundance ratio of the second phase was small and the diffusibility of Li at the time of charging and discharging was deceased. It is inferred that in Example 7, since the molar ratio (α/β) was small compared with that in Example 2, the amount of F having high electronegativity was large and the electron conductivity was reduced. It is inferred that, consequently, the initial discharge capacity was decreased.

As shown in Tables 1 and 2, the initial discharge capacity of the battery of Example 8 is smaller than that of the battery of Example 2.

A reason for this may be that in Example 8, the integrated intensity ratio $I_{(20°\text{-}23°)}/I_{(18°\text{-}20°)}$ is large compared with that in Example 2. It is inferred that, consequently, the abundance ratio of the second phase was small and the diffusibility of Li at the time of charging and discharging was decreased. It is inferred that, consequently, the initial discharge capacity was decreased.

As shown in Tables 1 and 2, the initial discharge capacity of the battery of Example 9 is smaller than those of the batteries of Examples 4 and 5.

A reason for this may be that in Example 9, the value of ((x+y)/(α+β)) is larger than those of Examples 4 and 5. It is inferred that, consequently, the amount of defect in the anion was large and the crystal structure at the time of releasing Li was destabilized. It is inferred that as a result, the initial discharge capacity was decreased.

The positive electrode active material of the present disclosure can be used for a battery, such as a secondary battery.

What is claimed is:

1. A positive electrode active material comprising:
a lithium composite oxide, wherein:
the lithium composite oxide is a multiphase mixture including a first phase having a crystal structure belonging to space group C2/m and a second phase having a crystal structure belonging to space group R-3m,
the lithium composite oxide satisfies a mathematical expression (I): 0.05≤integrated intensity ratio $I_{(20°\text{-}23°)}/I_{(18°\text{-}20°)}$≤0.26, where the integrated intensity ratio $I_{(20°-23°)}/I_{(18°-20°)}$ is equal to a ratio of an integrated intensity $I_{(20°-23°)}$ to an integrated intensity $I_{(18°-20°)}$;

the integrated intensity $I_{(18°-20°)}$ is an integrated intensity of a first maximum peak present in a diffraction angle 2θ range of greater than or equal to 18° and less than or equal to 20° in an X-ray diffraction pattern of the lithium composite oxide; and the integrated intensity $I_{(20°-23°)}$ is an integrated intensity of a second maximum peak present in a diffraction angle 2θ range of greater than or equal to 20° and less than or equal to 23° in the X-ray diffraction pattern of the lithium composite oxide, and the lithium composite oxide has an average composition represented by a compositional formula (I): $Li_xMn_yO_\alpha Q_\beta$, where, Q is at least one selected from the group consisting of F, Cl, N, and S; and following four mathematical expressions:

$1.05 \leq x \leq 1.5$, $0.6 \leq y \leq 1.0$, $1.2 \leq \alpha \leq 2.0$, and $0 < \beta \leq 0.8$ are satisfied.

2. The positive electrode active material according to claim 1, wherein

Q includes F.

3. The positive electrode active material according to claim 1, wherein following two mathematical expressions:

$1.166 \leq x \leq 1.4$, and $0.67 \leq y \leq 1.0$ are satisfied.

4. The positive electrode active material according to claim 1, wherein following two mathematical expressions:

$1.33 \leq \alpha \leq 1.9$, and $0.1 \leq \beta \leq 0.67$ are satisfied.

5. The positive electrode active material according to claim 1, wherein a following mathematical expression:

$1.4 \leq x/y \leq 2.0$ is satisfied.

* * * * *